United States Patent
Ren et al.

(10) Patent No.: US 8,965,388 B2
(45) Date of Patent: Feb. 24, 2015

(54) FAST EFFICIENT RESOURCE DISTRIBUTION IN LONG TERM EVOLUTION COMMUNICATION NETWORK SCHEDULING

(75) Inventors: Hong Ren, Kanata (CA); Leonard Lightstone, Ottawa (CA); Parsa Larijani, Ottawa (CA); Girum Alebachew Fantaye, Kista (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 220 days.

(21) Appl. No.: 13/450,640

(22) Filed: Apr. 19, 2012

(65) Prior Publication Data
US 2013/0281105 A1    Oct. 24, 2013

(51) Int. Cl.
*H04W 72/04*    (2009.01)

(52) U.S. Cl.
USPC ........................................ 455/452.1

(58) Field of Classification Search
CPC ............ H04W 72/04; H04W 72/1242; H04W 72/1263; H04L 12/5693; H04L 47/6215
USPC ............... 370/329, 395.2–395.43; 455/435.2, 455/435.3, 434, 436, 515, 517, 452.1, 450
See application file for complete search history.

(56) References Cited

U.S. PATENT DOCUMENTS

| | | | |
|---|---|---|---|
| 2007/0072645 | A1 | 3/2007 | Clark et al. |
| 2008/0205290 | A1 | 8/2008 | Wille et al. |
| 2009/0201920 | A1 | 8/2009 | Cherchali et al. |

FOREIGN PATENT DOCUMENTS

| | | |
|---|---|---|
| CN | 102238627 A1 | 11/2011 |
| EP | 1 282 324 A1 | 2/2003 |
| EP | 2 299 753 A1 | 3/2011 |
| WO | 2011046477 A1 | 4/2011 |
| WO | 2011078392 A1 | 6/2011 |

OTHER PUBLICATIONS

Partial_European_Search_Report for corresponding European Application No. 13001590.2-1854 consisting of 6-pages.
Extended European Search Report dated Jan. 14, 2014 for corresponding European Application No. 13001590.2-1854, Filed Mar. 27, 2013 consisting of 11-pages.

*Primary Examiner* — Kiet Doan
*Assistant Examiner* — Dung Lam
(74) *Attorney, Agent, or Firm* — Christopher & Weisberg, P.A.

(57) ABSTRACT

A method and system for determining, for a transmission time interval (TTI), an amount of resource units to be allocated to each cell served by at least one module in a wireless communication network are disclosed. The allocation is based on an estimated resource consumption of each cell, a resource limit of each cell and resource limits of the at least one module. For each TTI, a prioritized list of queues having information to be transmitted is determined, where each queue belongs to a cell of the plurality of cells. Also, for each TTI, in an order of priority of the queues, a number of resource units to be consumed by a queue is determined based at least in part on a number of resource units required to empty the queue.

21 Claims, 5 Drawing Sheets

FAST EFFICIENT RESOURCE DISTRIBUTION IN LONG TERM EVOLUTION COMMUNICATION NETWORK SCHEDULING

TECHNICAL FIELD

The present invention relates to a method and system for scheduling resources in a wireless communication network.

BACKGROUND

In long term evolution (LTE) technology a scheduler is responsible for allocating both uplink (UL) and downlink (DL) resources to mobile user equipment (UE) every transmission time interval (TTI) of a radio frame. A TTI is 1 millisecond in duration. The complexity of scheduling and resource allocation combined with tight TTI constraints on processing prohibits recursive types of processing that would lead to optimal allocation of radio resources.

Resource scheduling may also be constrained based on licensing agreements, hardware constraints or software constraints. When finite resources are available as a pool across a group of cells that are being scheduled, a problem of how best to distribute these resources presents challenges. Iterative solutions to achieve global optimization—that is, optimization of resource allocation over all cells—can find on optimal distribution of resources. But these iterative solutions are too complex and time-consuming to be processed in a TTI.

Simplified pre-scheduling allocation of resources—that is, gross allocation of resources across the cells prior to detailed per user equipment (UE) or per-queue scheduling within each cell individually—can be of relatively low complexity. However, if not done accurately, these methods will result in under-utilization of resources and possibly may also result in priority inversion of scheduling entities between cells.

SUMMARY

A method and system for pre-scheduling pooling of resource units of at least one module in a node of a wireless communication network is provided. The at least one module services a plurality of cells, and where each cell may have a plurality of queues. According to one aspect, the invention provides a method that includes determining, for a transmission time interval (TTI), a total amount of resource units available for allocation to the plurality of cells by the at least one module. An amount of resource units to be consumed by each of the plurality of cells is estimated based on resource limits for each of the plurality of cells and resource limits of the at least one module. An amount of resource units to be allocated to each cell served by the at least one module is determined based on the estimated resource consumption of each cell, the resource limits of each cell and the resource limits of the at least one module.

According to another aspect, an apparatus pre-schedules a total amount of resource units in a wireless communication network having a plurality of cells. The apparatus includes a memory and a processor. The memory is configured to store a total amount of resource units available for allocation to the plurality of cells, an estimated amount of resource units to be consumed by each of the plurality of cells and an amount of resource units allocated to each cell served by the at least one module. The processor is configured to determine, for a transmission time interval, the total amount of resource units available for allocation to the plurality of cells by the at least one module. The process is also configured to estimate the amount of resource units to be consumed by each of the plurality of cells based at least in part on resource limits for each of the plurality of cells and resource limits of the at least one module. The processor is also configured to determine the amount of resource units to be allocated to each cell served by the at least one module based on the estimated resource consumption of each cell, the resource limits of each cell and the resource limits of the at least one module.

According to still another aspect, a wireless communication system includes a network node having at least one module. The at least one module has a total number of allocable resource units. The at least one module is configured to allocate resource units to a queue of a corresponding cell served by the network node until the sooner of: (1) allocating resource units to the queue sufficient to empty the queue, (2) any of the resource units of the corresponding cell are exhausted, and (3) any of the resource units of the total allocable resource units is are exhausted.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Before describing in detail exemplary embodiments that are in accordance with the present invention, it is noted that the embodiments reside primarily in combinations of apparatus components and processing steps related to pre-scheduling resource allocation in a wireless communication network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 1:
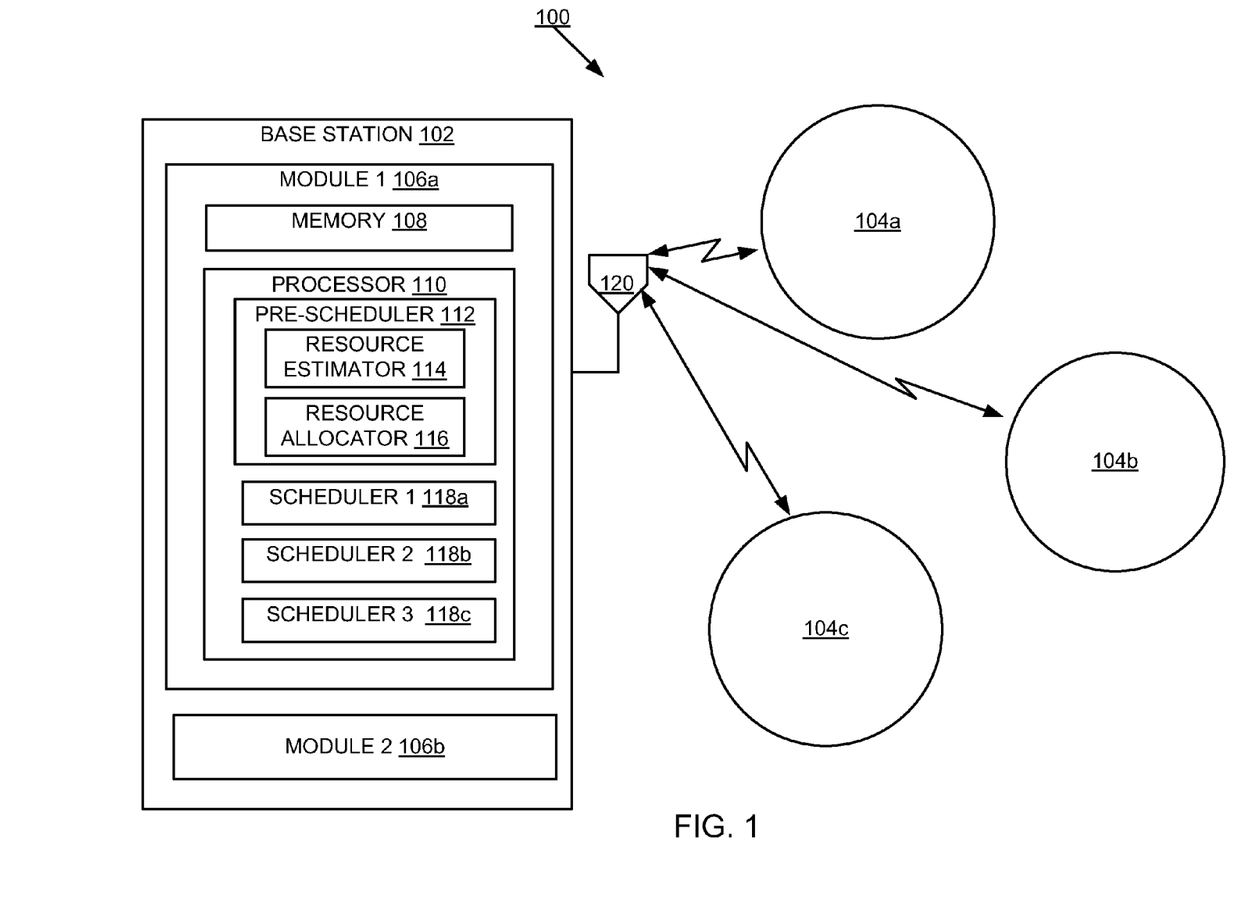
FIG. 1 is a block diagram of an exemplary wireless communication system constructed in accordance with principles of the present invention.

Referring now to the drawing figures, in which like reference designators denote like elements, there is shown in FIG. 1 an exemplary wireless communication system 100 constructed in accordance with principles of the present invention and having at least one base station 102 serving a plurality of cells 104a, 104b and 104c, hereinafter referred to as cells 104. Each cell may serve a plurality of user equipment (UE) units in the coverage area of the cell.

The base station 102 has one or more modules 106, for example, modules 106a and 106b. Each module 106 performs allocation of resource units among one or more of cells 104, such as cells 104a, 104b and 104c. The base station 102 is in communication with the cells 104 via one or more antennas 120. As such, a module 106 includes a memory 108 and a processor 110. The processor 110 includes a pre-scheduler 112, which includes a resource estimator 114 and a resource allocator 116. The pre-scheduler 112 estimates and allocates resource units prior to scheduling of the allocated resource units by individual schedulers 118a, 118b and 118c, referred to collectively as schedulers 118.

The resource allocator 116 implements a process to allocate resources such as L2-bits, scheduling blocks (SB) (or physical resource blocks (PRB)) and scheduled entities, or may include any other finite scheduled resource such as an amount of processor cycles. The allocation of resource units is based on an estimate, performed by resource estimator 114, of a number of scheduling blocks (SB) needed to carry all data in a queue for each of a plurality of queues. As such, the number of resource units required to empty a queue may depend upon channel conditions for the user equipment (UE) associated with the queue. Any item that is scheduled may be referred to herein as a scheduling entity (SE), which can include, for example, a UE, a broadcast message, etc. Each scheduling entity can have one or more queues. A number of scheduling blocks (SB) required to carry a certain amount of data can be estimated before actual scheduling and link adaptation. Methods for estimating scheduling block quantities are known and are beyond the scope of this invention.

Each queue is associated with a number of scheduling blocks (SB) required to empty the queue. The number of SBs required to empty a queue may be estimated or reserved. For example, for broadcast messages, the number of SBs can be calculated accurately and are therefore reserved. As another example, for non-adaptive hybrid automatic repeat request (HARQ) re-transmissions, the number of required SBs is known and can therefore be reserved. Differences between allocation of reserved queues and unreserved queues are explained below with reference to FIGS. 4 and 5.

The resource estimator 114 allocates resource units to queues in an order of priority of the queues. The resource units estimated to be needed to empty a queue of its data is compared to remaining unallocated resource units. Queues are processed until a resource is exhausted. The estimated resource utilization for each resource and each cell is then employed as a weighting function to pre-apportion a particular resource to each cell as input to a detailed scheduling operation of a scheduler for each cell. For example, if the estimated utilization of resource units for a particular cell is 20% then the weight function has a value of 0.2 which is multiplied by the total resource units available to obtain the amount of resources allocated to the cell. After the allocation, the allocated resource units are checked against the cell resource limit and the smaller of the two will be used. If the total allocated resource units across all cells is less than the available resource units, the surplus resource units can be distributed to cells that can consume more resource units without exceeding the cell resource limit.

Accordingly, each cell 104a, 104b, 104c has a respective scheduler 118a, 118b, 118c, associated therewith. More or fewer cells and schedulers may be implemented. The invention is thus not limited to the number of cells and schedulers shown in FIG. 1. In operation, each scheduler 118 performs detailed scheduling of the resources allocated to the cell. Upon completion of the detailed scheduling operation of a scheduler 118, any over-utilization or under-utilization of a finite resource by the cells 104 can be accrued and applied as a surplus or deficit when allocating resources for use in subsequent transmission time intervals (TTI). In other words, the total allocable resource units of a module for a present TTI may be based on a use of resource units in a previous TTI.

In performing the resource allocation, the resource estimator 114 uses elastic factors that may be determined by simulation and field testing. Elastic factors are described below. As an example, a cell resource unit usage limit may be expressed as (100+f) %, where f is an elastic factor that can be simulated to optimize or improve performance of a resource allocation algorithm. The elastic factors are used in the initial phases of resource allocation to accommodate estimation errors. At the last step of resource allocation, the resource limits may be enforced.

Thus, some embodiments provide pre-scheduling pooling of resource units. The resource units may include processor cycles, frequency bandwidth, and other resource units. A total amount of resource units are associated with a module 106 of a node or base station 102 of a wireless communication network 100. A pre-scheduler 112 of the module 106 determines, for each transmission time interval (TTI), an amount of resources to be allocated to each of a plurality of cells 104. The amount of resources allocated to a cell 104 is based on an estimated resource consumption by the cell 104, the resource limits of the cell 104 and the resource limits of the module 106. A prioritized list of queues having information to be transmitted is determined. In an order of priority, the number of resource units allocated to a queue is based at least in part on a number of resource units required to empty the queue. For example, the number of resource units to be allocated by the resource allocator 116 to a queue may be based on whether the number of resources to empty the queue of a cell exceeds the number of unallocated resource units of the module or the number of unallocated resource units of the cell. When a number of resource units to empty a queue exceeds the number of unallocated resources of the cell of the queue, but does not exceed the number of unallocated resource units of the module, the resource allocator 116 allocates the number of unallocated resource units of the cell to the queue. When the number of resource units to empty the queue exceeds the number of unallocated resource units of the cell, and exceeds the number of unallocated resource units of the module, the smaller of the number of the unallocated resources of the cell and the number of unallocated resources of the module are allocated to the queue. When the number of resource units to empty the queue is less than the number of unallocated resource units of the cell, and is less than the number of unallocated resource units of the module, the number of resource units to empty the queue are allocated to the queue. When the number of resource units to empty a queue of the cell exceeds the number of unallocated resource units of the module, but does not exceed the number of unallocated resource units of the cell, the number of unallocated resource units of the module are allocated to the queue.

Estimation of the amount of resources to be consumed by the queues of the cells may terminate upon occurrence of one of the following conditions: (1) all queues are processed, (2) any resources of the module are exhausted, and (3) any resources of all cells are exhausted. In the estimation phase of operation, some elastic factors are used to accommodate estimation errors when considering resource allocation. The final resource allocation is decided by normalizing the output of the resource estimator 114 against the actual resources available with all resource limits being enforced. Once the allocation of all resource units is determined, a main scheduling process in each cell is initiated to schedule the resource units allocated to the cell. This scheduling is performed by each cell during a transmission time interval in parallel.

Figure 2:
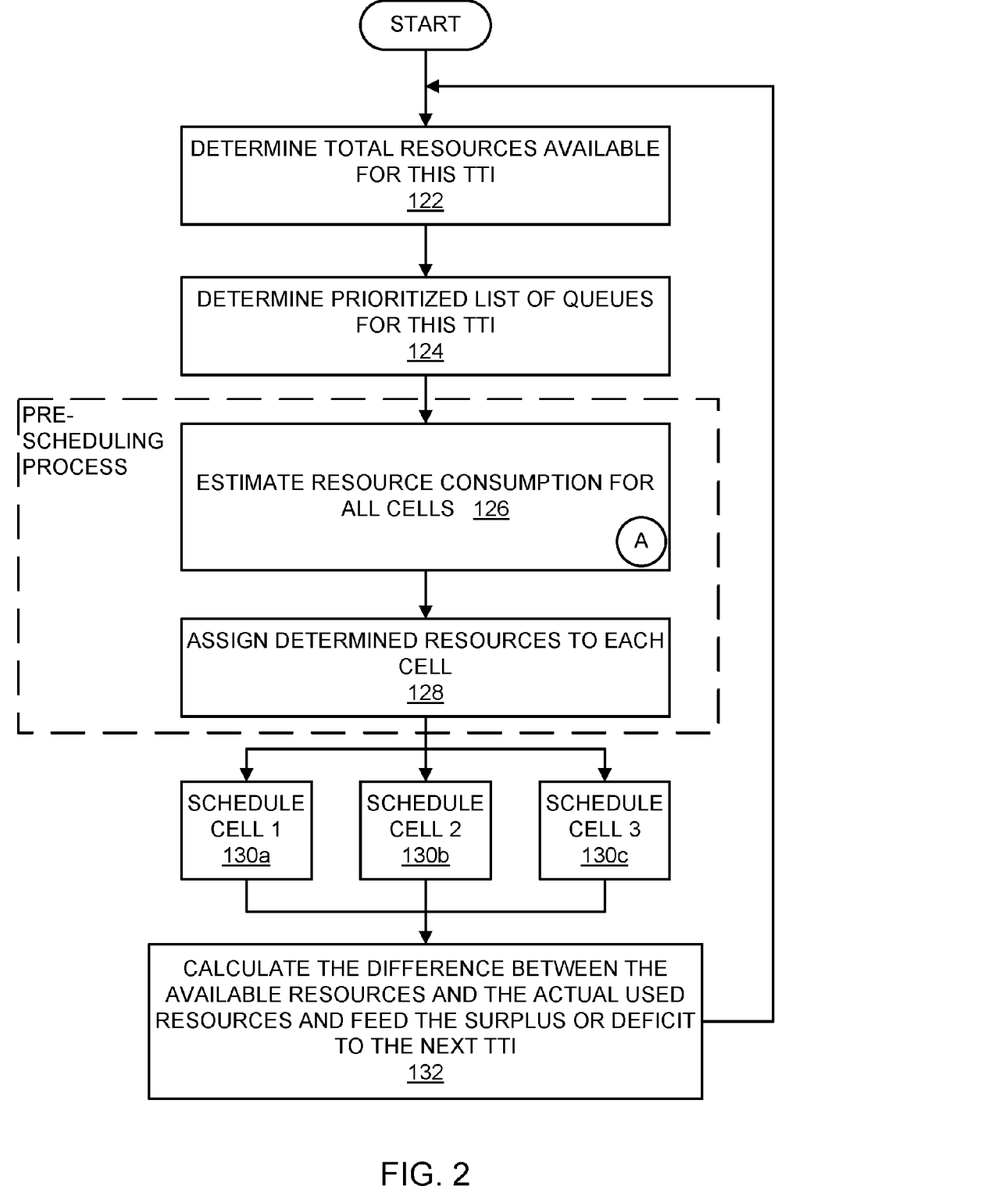
FIG. 2 is a flowchart of an exemplary process for pre-scheduling allocation of resource units in the context of the full scheduling process in accordance with principles of the present invention.
Figure 3:
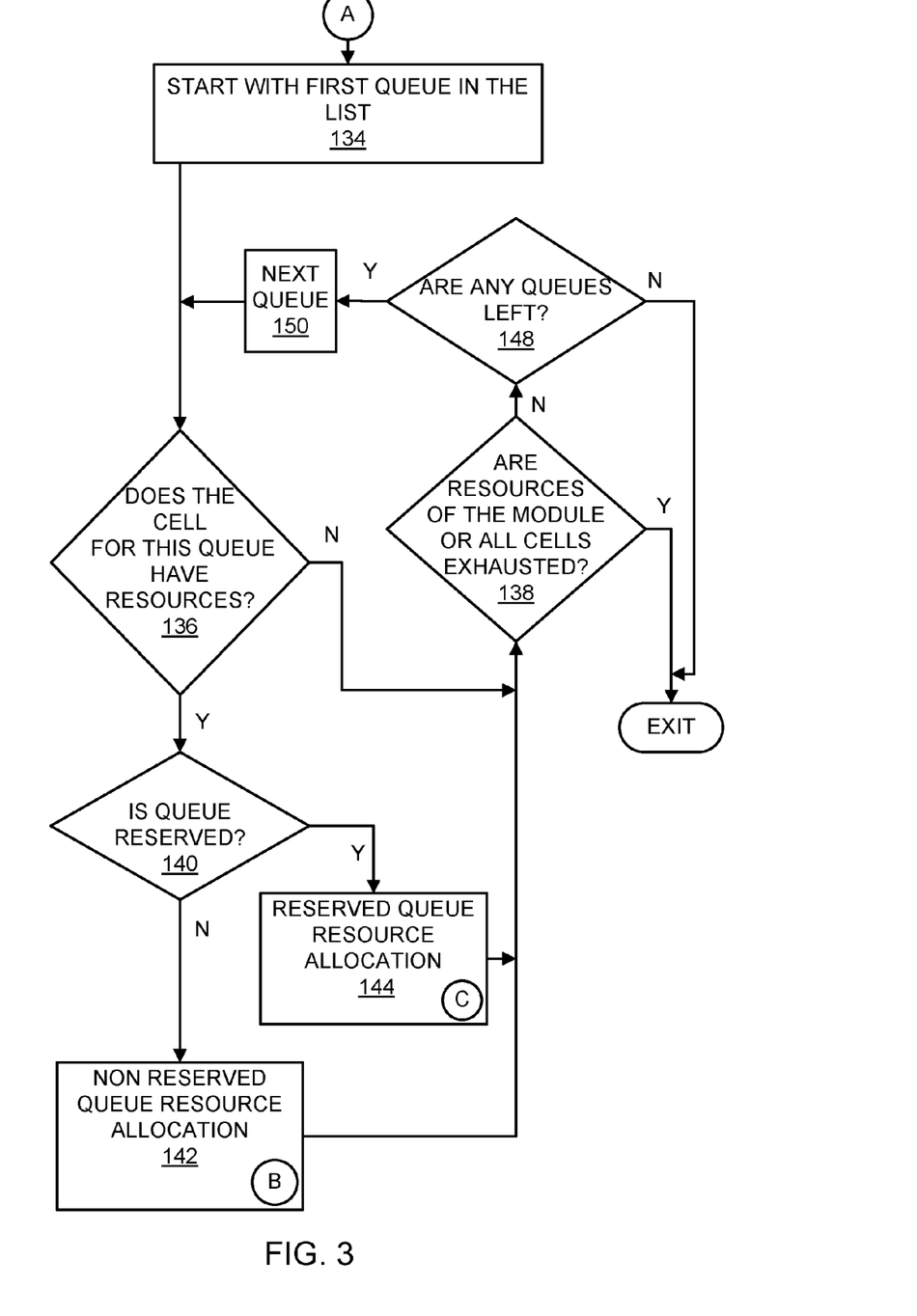
FIG. 3 is a flowchart of an exemplary process for pre-scheduling estimation of resource units in accordance with principles of the present invention.

FIG. 2 is a flowchart of an exemplary process performed by the pre-scheduler 112 for pre-schedule allocation of resource units in accordance with principles of the present invention. The total amount of resources that are available for pre-scheduling allocation is determined for a next transmission time interval (TTI) (step 122). A prioritized list of queues for the TTI is also determined (step 124) and is input to the pre-scheduler 112. The resource estimation process is then performed according to a process A which is shown in FIG. 3 (step 126). Based on the results of the resource estimation process A and cell resource limits, resource units are assigned to each cell (step 128). Then, in the TTI, the schedulers 118 for the cells 104 shown in FIG. 1 perform detailed scheduling in parallel based on the resource units provided by the base station 102 (steps 130a, 130b and 130c).

The amount of resources actually consumed are compared to the resources available to determine an under-utilization or over-utilization of resources (step 132). The determined utilization is fed back to step 122, to adjust the total resources available for the next TTI.

The resource estimation process A of step 126 is described in detail with reference to FIG. 3. The process begins at step S134 with the first queue in the prioritized list of queues determined in step 124 of FIG. 2. The process determines the cell associated with the queue and determines whether the cell for this queue has resource units available (step 136). If the cell does not have resource units available, then a determination is made whether all resources of the module or the cells are exhausted (step 138). If all resources are exhausted, the process ends.

Figure 4:
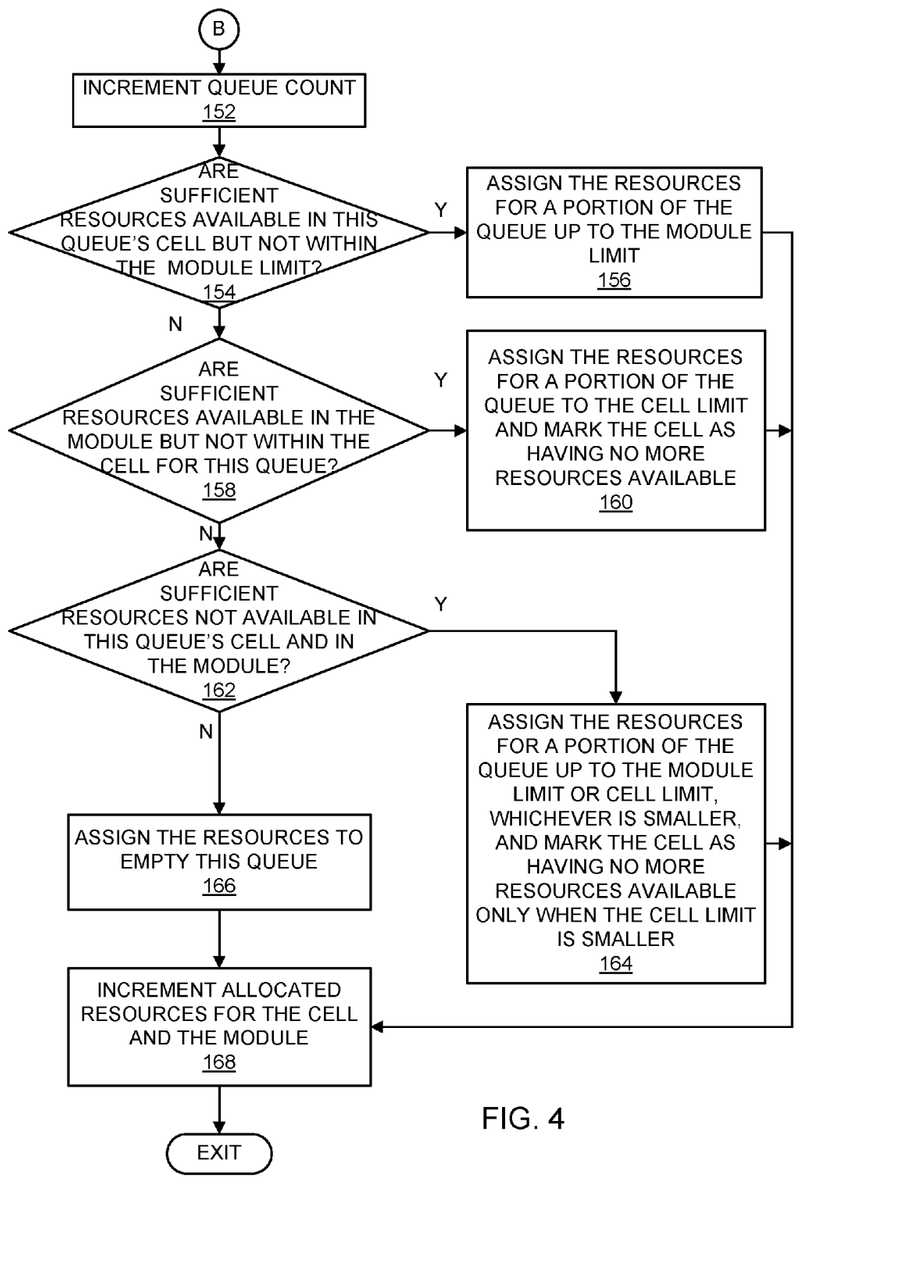
FIG. 4 is a flowchart of an exemplary process for estimation of resource units for non-reserved queue resource allocation in accordance with principles of the present invention.
Figure 5:
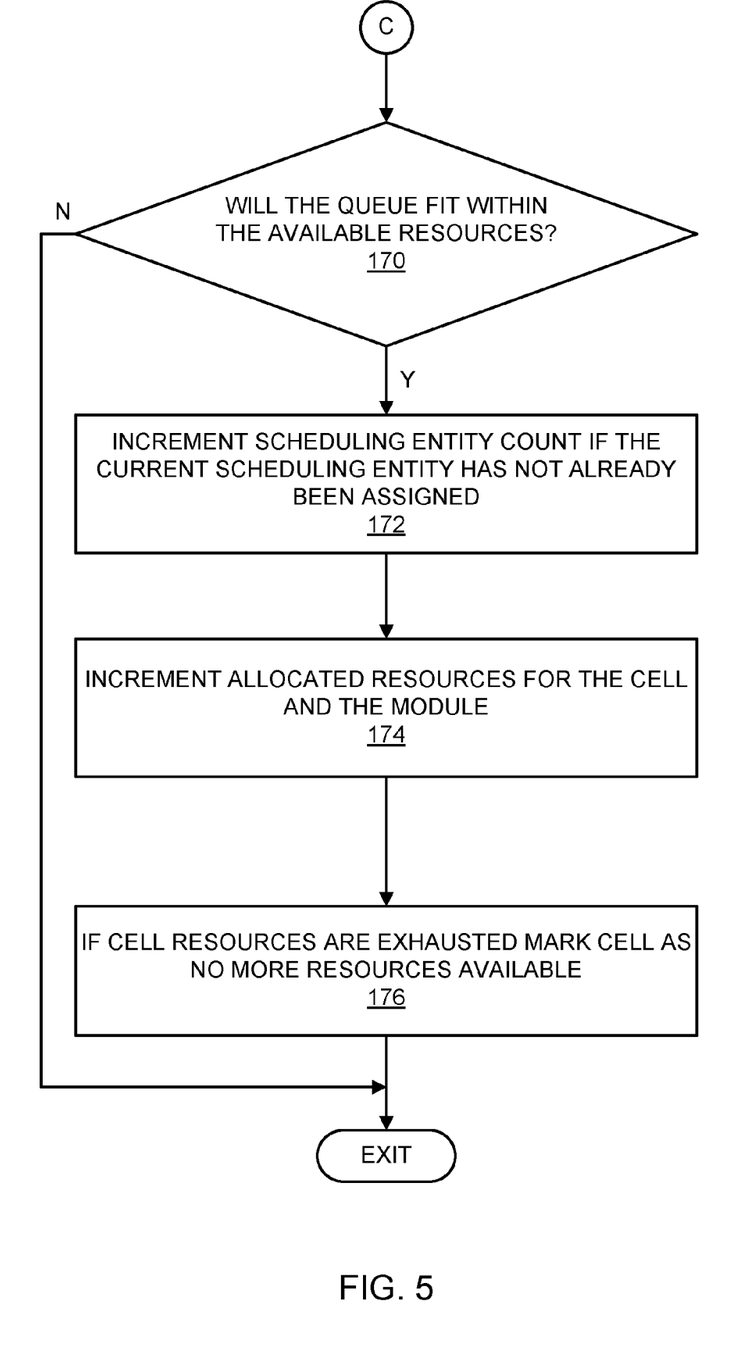
FIG. 5 is a flowchart of an exemplary process for estimation of resource units for reserved queue resource allocation in accordance with principles of the present invention.

If the cell for the present queue has available resources a determination is made whether the queue is reserved (step 140). If the queue is not reserved, then a non-reserved queue resource allocation process B is performed (step 142). Process B of step S130 is shown in FIG. 4. If the queue is reserved, then a reserved queue resource allocation process C is performed (step 146). Process C of step 132 is shown in FIG. 5. After completion of process B or C, a determination is made whether all resources are exhausted (step 138). If all resources are exhausted, then the process A of FIG. 3 ends. If not all resources are exhausted, a determination is made whether any queues are left (step 148). If not, the process A ends. If one or more queues are left, then the process A continues with the next queue (step 150).

An exemplary process B of step 142 for non-reserved queue resource allocation is described in detail in reference to FIG. 4. Upon commencement of the process, a queue count is incremented (step 152). A determination is made as to whether sufficient resources are available in this queue's cell but not within the module limit (step 154). If so, resource units are assigned for a portion of the queue up to the module limit (step S156). Otherwise, a determination is made as to whether sufficient resources are available in the module but not within the cell (step 158). If so, resource units are assigned for a portion of the queue up to the cell limit, and the cell is marked as having no remaining resources (step 160). Otherwise, a determination is made as to whether sufficient resources are not available in this queue's cell or in the module (step 162). If sufficient resources are not available in this queue's cell or in the module, then resource units are assigned for a portion of the queue up to the module or cell limit, whichever limit is smaller, and the module or cell, respectively, is marked as having no remaining resources available (step 164). Otherwise, a portion of the available resources are assigned to empty the queue (step 166). Then the amount of resources allocated for the cell and the module are incremented (step 168). The process then returns to step 138 of FIG. 3.

An exemplary process C of step 146 for reserved queue resource allocation is described in detail in reference to FIG. 5. A determination is made as to whether a queue will fit within available resources of the cell and the module (step 170). If not, the process C ends and control is returned to step 138 of FIG. 3. Otherwise, if the current scheduling entity (e.g., a user equipment (UE)) has not already been assigned, then the scheduling entity count is incremented (step 172). The allocated resource unit count is incremented for the cell and the module (step 174). If any cell resources are exhausted, then the cell is marked as having no more resources available (step 176). Thus, in some embodiments, resource units may be allocated to a reserved queue only when enough resource units are available to empty the reserved queue.

Before providing an exemplary pseudo-code for pre-schedule resource allocation implemented by the preschedular 112 of the processor 110, certain definitions are set forth below:

acceptanceFactorSbs: a parameter used to determine if a queue can be selected based on number of remaining available SBs.

acceptanceFactorBits: a parameter used to determine if a queue can be selected based on number of remaining available bits.

availableBits: number of transfer block size (TBS) bits available (pooled). It is bitsBudgetTti minus the total number of reserved TBS bits for accepted queues.

availableSbs: number of available SBs (pooled). It is sbsBudgetTti minus the total number of reserved SBs for accepted queues.

bandwidth[cellID]: the bandwidth in the unit of SBs for a cell.

bitsBudgetTti: the total number of TBS bits available for this TTI. It can be due to hardware limit, license limit, etc.

bitsPerSb[mcs]: the average number of bits that can be carried by a SB for the given modulation and coding scheme (mcs).

cellSbsLimit: the cell SBs usage limit. It is a percentage and is relative to the cell bandwidth. It may be set to more than 100% to allow estimation error. cellSbsLimit=1+f, where f is a conservative elastic factor that can be simulated to optimize algorithm performance.

desiredSbsCell[cellId]: sum of desiredSbsQ[i] for the accepted (non-reserved) SEs in the cell.

desiredSbsQ[i]: the estimated number of non-reserved SBs needed for Qi (i-th queue in the combined sorted list).

minBits: the number of TBS bits limit. SE pooling is complete if the number of TBS bits available for SEs with reserved SBs is less than or equal to this limit.

modifiedDesiredSbsQ[i]: the estimated number of SBs that may be assigned to Qi taking into account pooling constraints.

modifiedQBits[i]: the estimated number of bits that may be assigned to Qi taking into account pooling constraints.

pooledBitsLimit: the pooled data bits limit. It may be a percentage and is relative to the number of bits available. It is set to more (or less) than 100% to allow estimation error. pooledBitsLimit=1+g, where g is a conservative elastic factor that can be simulated to optimize algorithm performance.

pooledSbsLimit: the pooled SBs usage limit. It is a percentage and is relative to the absolute pooled SBs limit. It may be set to more (or less) than 100% to allow estimation error. pooledSbsLimit=1+e, where e is a conservative elastic factor that can be simulated to optimize algorithm performance.

pooledSesLimit: the pooled limit on the number of SEs.

reservedSbsCell[cellId]: sum of reservedSbsQ[i] for SEs in the cell.

reservedSbsQ[i]: the number of SBs reserved for Qi.

sbsBudgetTti: the total number of SBs available for this TTI. It can be due to hardware limit, license limit, etc.

sbStep: granularity of SBs in terms of SB allocation. The number of allocated SBs has to be multiple of this number.

QBits [i]: amount of data for Qi. For a queue with reserved SBs, it is TBS bits. For a queue without reserved SBs, it is RLC SDU bits or RLC SDU bits plus certain number of bits to account for the header.

totalDesiredSbs: the accumulated amount of SBs requested to address non-reserved queues across all cells. For each TTI, the value is incremented from zero as each non-reserved queue is evaluated by the scheduler.

totalDesiredBits: the accumulated amount of RLC payload bits requested to address non-reserved queues across all cells. For each TTO, the value is incremented from zero as each non-reserved queue is evaluated by the pre-scheduler.

During execution of an algorithm for pre-schedule resource allocation, several constraints may be employed, such as the following:

(1) The number of pooled SEs is limited (selectedSes<=pooledSesLimit), where selectedSes is the number of selected scheduling entities.

(2) The pooled SB resource is limited. This constraint can be expressed as totalDesiredSbs/availableSbs<=pooledSbsLimit. It can also be written as availableSbs>=totalDesiredSbs/pooledSbsLimit (3) The cell SB resource is limited. This constraint can be expressed as desiredSbsCell[cellId]/(bandwidth[cellId]−reservedSbsCell[cellId])<=cellSbsLimit. It can also be written as bandwidth[cellId]>=reservedSbsCell[cellId]+desiredSbsCell[cellId]/cellSbsLimit The pooled number of TBS bits is limited. It is expressed as totalDesiredBits/availableBits<pooledBitsLimit An algorithm for pre-scheduling resource allocation performed by the pre-scheduler 112 of the processor 110 is outlined in pseudo code as follows:

```
Begin algorithm;
    Take the queue lists from all cells to be pooled and make a new combined sorted (by
priority) list;
    Perform initialization for all cells;
        desiredSbsCell[cellId] = 0, reservedSbsCell[cellId] = 0, desiredBitsCell[cellId] = 0,
reservedBitsCell[cellId] = 0, selectedSes = 0, totalDesiredSbs = 0, totalDesiredBits = 0,
currentCellUsage[cellId] = 0, currentBbmUsage = 0, availableSbs = sbsBudgetTti, availableBits =
bitsBudgetTti, pooledSbsUsage = 0
    Initially, all cells to be pooled have resources;
    While (selectedSes < pooledSesLimit) & (pooledSbsUsage < pooledSbsLimit) &
(totalDesiredBits / availableBits < pooledBitsLimit) & (SE pooling not complete);
        Take the next queue (Qi) from the combined queue list;
        Identify the SE and thus the cell it belongs to;
        Obtain the associated number of SBs, desiredSbsQ[i] or reservedSbsQ[i];
        If the cell still has resources & SBs are not reserved for Qi;
            Select the queue;
            If the SE to which the queue belongs is not selected;
                Mark the SE as selected;
                selectedSes += 1;
            End;
        sbsForPool = ceiling { (desiredSbsQ[i] + totalDesiredSbs) / pooledSbsLimit };
        sbsForCell = ceiling { (desiredSbsQ[i] + desiredSbsCell[cellId]) / cellSbsLimit };
        If { availableSbs < sbsForPool } & { bandwidth[cellId] >= reservedSbsCell[cellId] +
sbsForCell };
            modifiedDesiredSbsQ[i] = ceiling{ (availableSbs * pooledSbsLimit − totalDesiredSbs) /
sbStep) } * sbStep;
            modifiedQBits[i] = modifiedDesiredSbsQ[i] * bitsPerSb[mcs];
            desiredSbsCell[cellId] += modifiedDesiredSbsQ[i];
            desiredBitsCell[cellId] += modifiedQBits[i];
            totalDesiredSbs += modifiedDesiredSbsQ[i];
            totalDesiredBits += modifiedQBits[i];
        elseif { availableSbs >= sbsForPool } & { bandwidth[cellId] < reservedSbsCell[cellId] +
sbsForCell };
            modifiedDesiredSbsQ[i] = ceiling{ (bandwidth[cellId] − reservedSbsCell[cellId]) *
cellSbsLimit - desiredSbsCell[cellId] } /sbStep} * sbStep;
            modifiedQBits[i] = modifiedDesiredSbsQ[i] * bitsPerSb[mcs];
            desiredSbsCell[cellId] += modifiedDesiredSbsQ[i];
            desiredBitsCell[cellId] += modifiedQBits[i];
            totalDesiredSbs += modifiedDesiredSbsQ[i];
            totalDesiredBits += modifiedQBits[i];
            Mark the cell with no more resources;
        elseif { availableSbs < sbsForPool } & { bandwidth[cellId] < reservedSbsCell[cellId] +
sbsForCell };
            temp1 = ceiling{ (availableSbs * pooledSbsLimit − totalDesiredSbs) / sbStep) } * sbStep;
            temp2 = ceiling{ { (bandwidth[cellId] − reservedSbsCell[cellId]) * cellSbsLimit -
desiredSbsCell[cellId] } /sbStep} * sbStep;
            modifiedDesiredSbsQ[i] = min(temp1, temp2);
            modifiedQBits[i] = modifiedDesiredSbsQ[i] * bitsPerSb[mcs];
            desiredSbsCell[cellId] += modifiedDesiredSbsQ[i];
            desiredBitsCell[cellId] += modifiedQBits[i];
                totalDesiredSbs += modifiedDesiredSbsQ[i];
                totalDesiredBits += modifiedQBits[i];
```

```
    if temp1 >= temp2;
        Mark the cell with no more resources;
    End;
    If temp 1 <= temp2;
        SE pooling is complete;
    End;
    Else;
    desiredSbsCell[cellId] += desiredSbsQ[i];
    desiredBitsCell[cellId] += QBits[i];
        totalDesiredSbs += desiredSbsQ[i];
        totalDesiredBits += QBits[i];
    End;
    pooledSbsUsage = totalDesiredSbs / availableSbs;
        elseif the cell still has resources (SBs are reserved for Qi);
    sbsForCell = ceiling(desiredSbsCell[cellId] / cellSbsLimit);
        sbsForPool = ceiling(totalDesiredSbs / pooledSbsLimit);
    If bandwidth[cellId] >= reservedSbsQ [i] + reservedSbsCell[cellId] + sbsForCell;
    SbRoom = availableSbs − totalDesiredSbs / pooledSbsLimit;
    If { (SbRoom >= acceptanceFactorSbs * reservedSbsQ[i] ) & (availableBits >=
acceptanceFactorBits * QBits[i]) };
        Select the queue;
            If the SE to which the queue belongs is not selected;
                Mark the SE as selected;
                selectedSes += 1;
            End;
    reservedSbsCell[cellId] += reservedSbsQ[i];
    reservedBitsCell[cellId] += QBits[i];
        availableSbs -= reservedSbsQ[i];
        availableBits -= QBits[i];
    pooledSbsUsage = totalDesiredSbs / availableSbs;
    if availableSbs <= sbsForPool || availableBits <= minBits;
        SE pooling is complete;
    Elseif bandwidth[cellId] = reservedSbsCell[cellId] + sbsForCell;
        Mark the cell with no more resources;
    End;
            End;
        End;
    End;
    If the last queue in the combined list is processed;
        SE pooling is complete;
    End;
End.
```

This ends the pre-schedule resource allocation algorithm. The number of SEs to be processed by each cell level scheduler 118 can be simply the number of SEs selected so far for the cell. If the total number of selected SEs is less than the module SE limit, one option is to assign the next SE in the queue list as a resource to be processed by the cell scheduler and continue this process until the first of a) each cell has reached its SE limit, or b) the module has reached its SE limit.

Exemplary steps for pooling of scheduling blocks (SB) are as follows:

```
allocatedSbsCell[cellId] = ceiling(availableSbs * desiredSbsCell[cellId] /
totalDesiredSbs)
allocatedSbsCell[cellId] += reservedSbsCell[cellId]
allocatedSbsCell[cellId] = min(bandwidth[cellId], allocatedSbsCell[cellId])

if sbsBudgetTti > ∑_{cells} allocatedSbsCell[cellID]

The remaining SBs can be distributed to all cells for this TTI
End
```

There are different distribution algorithms for distributing the remaining SBs as follows:

Equal split—which distributes the remaining SBs equally among all remaining queues;

Proportional to allocatedSbs[cellId]—which distributes the remaining SBs in proportion to the allocated SBs.

Proportional to (bandwidth[cellId]−allocatedSbs[cellId]); and

Proportional to number of SEs selected for the cell.

Exemplary steps for pooling of TBS bits is as follows:

```
allocatedBitsCell[cellId]=floor
    (availableBits*desiredBitsCell[cellId]/to-
    talDesiredBits)

allocatedBitsCell[cellId]+=reservedBitsCell[cellId]
```

In the processes described above, queues are processed separately even when multiple queues from the same scheduling entity (SE) are selected. More specifically, when multiple queues from the same SE are selected, the process adds the estimated number of scheduling blocks (SB) for all selected queues individually. Another option is to estimate the number of SBs for the total amount of data of all queues of an SE. Thus, in one embodiment, multiple queues belonging to a single user or a group of users can be combined into a single virtual queue when estimating resource units required to empty all of the multiple queues. This alternative option may be expected to perform better, but at the cost of additional complexity.

In another alternative embodiment, if the SE limit is reached but the other resource limits are not reached, unselected queues of the selected SEs can be processed in order of priority until one of the resource limits is reached. In yet another alternative embodiment, data bits for hybrid automatic repeat request (HARQ) re-transmissions may be excluded when considering data bit limits in the algorithm. In yet another alternative embodiment, a limit may be placed on queues per SE, or on the total number of queues in the pool.

The processes presented herein provide a fast, low-complexity allocation of resources to each cell so that scheduling of the allocated resources at each cell can be performed in parallel without recursive computation. Thus, the processes presented herein result in more efficient use of radio resources and pooled internal eNODE B resources without imposing a computationally burdensome process on a scheduler of a cell. This translates to higher throughput and capacity while enforcing licensing and other constraints.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of pre-scheduling pooling of resource units of at least one module in a node of a wireless communication network, the at least one module serving a plurality of cells, the method comprising:
   determining, for a transmission time interval, a total number of resource units available for allocation to the plurality of cells by the at least one module;
   estimating a number of resource units to be consumed by each of the plurality of cells based at least in part on resource limits for each of the plurality of cells and resource limits of the at least one module;
   determining a number of resource units to be allocated to each cell served by the at least one module based on the estimated resource consumption of each cell, the resource limits of each cell and the resource limits of the at least one module;
   determining, for the transmission time interval, a prioritized list of queues having information to be transmitted, each queue belonging to a corresponding cell of the plurality of cells;
   determining, for the transmission time interval, in an order of priority of the queues, a number of resources units estimated to be allocated to a queue based at least in part on a number of resource units required to empty the queue; and
   allocating, using a processor, the determined number of resource units based at least in part on whether a number of resource units to empty a queue of a cell exceeds one of a number of unallocated resource units of the at least one module and a number of unallocated resource units of the cell.

2. The method of claim 1, further comprising:
   determining one of a resource surplus and a resource deficit after actual cell scheduling; and
   feeding back the one of the resource surplus and resource deficit for determination of the total resource units available for the next transmission time interval.

3. The method of claim 2, where the total number of resource units available for allocation in a TTI is based on one of (1) a hardware limitation of the at least one module, and (2) a license limit plus the one of the resource surplus and resource deficit.

4. The method of claim 1, wherein the number of resource units to be consumed by a cell served by the at least one module is estimated at least in part from resources required to at least partially empty queues selected to be transmitted from the corresponding cell.

5. The method of claim 4, further comprising selecting a queue for a corresponding cell for transmission based on at least in part the priority of the queue relative to the priorities of the other queues served by the at least one module.

6. The method of claim 4, wherein the queues include at least one reserved queue, and wherein a reserved queue for a cell is selected if the cell and the at least one module have enough resource units available to fully empty the queue.

7. The method of claim 4, wherein the queues include at least one non-reserved queue, and wherein estimating resources to be consumed by a non-reserved queue includes:
   determining the resource consumption needed to empty the non-reserved queue as completely as possible without exceeding the cell resource limits and the at least one module resource limits.

8. The method of claim 1, further comprising, when a number of resource units to empty a non-reserved queue exceeds a number of unallocated resource units of the cell, but does not exceed a number of unallocated resource units of the at least one module, allocating the number of unallocated resource units of the cell to the queue.

9. The method of claim 1, further comprising, when a number of resource units to empty the non-reserved queue exceeds a number of unallocated resource units of the cell, and exceeds a number of unallocated resource units of the at least one module, the smaller of the number of the unallocated resources of the cell and the number of unallocated resources of the at least one module are allocated to the queue.

10. The method of claim 1, further comprising, when a number of resource units to empty the non-reserved queue is less than a number of unallocated resource units of the cell, and is less than a number of unallocated resource units of the at least one module, the number of resource units to empty the queue are allocated to the queue.

11. The method of claim 1, wherein when a number of resource units to empty a non-reserved queue of the cell exceeds a number of unallocated resource units of the at least one module, but does not exceed a number of unallocated resource units of the cell, the number of unallocated resource units of the at least one module are allocated to the queue.

12. The method of claim 1, wherein transmission resource allocation to a queue of a cell is based on a priority of the queue.

13. The method of claim 1, wherein determining a prioritized list of queues further comprises identifying reserved queues, and wherein transmission resource units are allocated to a reserved queue only when enough resource units to empty the reserved queue are available.

14. The method of claim 1, wherein multiple queues belonging to a single user are combined as one virtual queue when estimating the transmission resource units required to empty all queues.

15. The method of claim 1, wherein the total allocable resource units of the at least one module in the present transmission time interval is based at least in part on a use of resource units in a previous transmission time interval.

16. The method of claim 1, wherein the estimation of the number of resource units to be allocated to the cells terminates upon occurrence of one of the following conditions:
all queues are processed;
any resources of the at least one module are exhausted; and
any resources of all cells are exhausted.

17. The method of claim 1 further comprising:
initially determining the number of resource units allocated to the plurality of cells using elastic factors to accommodate estimation errors; and
normalizing the number of resource units allocated to the plurality of cells by enforcing cell resource limits and module resource limits.

18. An apparatus for pre-scheduling a total number of resource units in a wireless communication network having a plurality of cells, the apparatus comprising:
a memory, the memory configured to store:
 a total number of resource units available for allocation to the plurality of cells;
 an estimated number of resource units to be consumed by each of the plurality of cells; and
 an number of resource units allocated to each cell served by the apparatus; and
a processor, the processor configured to:
 determine, for a transmission time interval, the total number of resource units available for allocation to the plurality of cells by the apparatus;
 estimate the number of resource units to be consumed by each of the plurality of cells based at least in part on resource limits for each of the plurality of cells and resource limits of the apparatus; and
 determine the number of resource units to be allocated to each cell served by the at least one module based on the estimated resource consumption of each cell, the resource limits of each cell and the resource limits of the apparatus;
 determine, for the transmission time interval, a prioritized list of queues having information to be transmitted, each queue belonging to a corresponding cell of the plurality of cells; and
 determine, for the transmission time interval, in an order of priority of the queues, a number of resources units estimated to be allocated to a queue based at least in part on a number of resource units required to empty the queue; and
 allocate the determined number of resource units based at least in part on whether a number of resource units to empty a queue of a cell exceeds one of a number of unallocated resource units of the apparatus and a number of unallocated resource units of the cell.

19. The apparatus of claim 18, wherein each cell has at least one queue, and wherein the processor is further configured to allocate to each queue of a corresponding cell a number of resource units that will not exceed a number of unallocated resource units of the cell.

20. The apparatus of claim 18, wherein each cell has at least one queue, and wherein the processor is further configured to allocate to each queue of a corresponding cell a number of resource units that will not exceed a number of unallocated resource units of the total amount of resource units.

21. The apparatus of claim 18, wherein the processor is further configured to designate the cell as full when at least one type of resource units of the cell have been fully allocated by the processor.

* * * * *